United States Patent
Sawada et al.

(10) Patent No.: US 6,304,346 B1
(45) Date of Patent: Oct. 16, 2001

(54) FAULT RESTORATION CONTROL METHOD AND IT'S APPARATUS IN A COMMUNICATION NETWORK

(75) Inventors: Yasushi Sawada, Yokohama; Hideaki Tsushima, Wako; Shigeki Kitajima; Tatsuo Kanetake, both of Kawasaki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/022,004

(22) Filed: Feb. 11, 1998

(30) Foreign Application Priority Data

Feb. 18, 1997 (JP) .................................................. 9-033779

(51) Int. Cl.[7] .................................................. H04B 10/00
(52) U.S. Cl. .............................. 359/110; 359/117; 359/161
(58) Field of Search ..................................... 359/110, 117, 359/139, 161

(56) References Cited

U.S. PATENT DOCUMENTS

| | | | |
|---|---|---|---|
| 5,457,556 | * 10/1995 | Shiragaki | 359/117 |
| 5,663,820 | * 9/1997 | Shiragaki | 359/128 |
| 5,757,526 | * 5/1998 | Shiragaki et al. | 359/110 |
| 5,870,212 | * 2/1999 | Nathan et al. | 359/119 |
| 5,914,798 | * 6/1999 | Liu | 359/161 |
| 5,933,258 | * 8/1999 | Flanagan et al. | 359/110 |
| 6,005,694 | * 12/1999 | Liu | 359/110 |

* cited by examiner

Primary Examiner—Leslie Pascal
(74) Attorney, Agent, or Firm—Antonelli, Terry, Stout & Kraus, LLP

(57) ABSTRACT

A method for restoration from a fault in a communication network formed by interconnecting a plurality of nodes including at least one set of node equipment each including a line terminal equipment and an optical cross-connect equipment, via a plurality of transmission lines using optical fibers. According to this method for restoration from a fault, if a line terminal equipment of at least one set of node equipment has detected a fault in an optical fiber under communication, it gives a command functioning as trigger for optical fiber change-over to an optical cross-connect equipment included in the node equipment. Upon receiving this command functioning as the trigger, the optical cross-connect equipment exchanges change-over control information indicating optical switch setting situation between it and an optical cross-connect equipment included in another node equipment, and forms a restoration route.

6 Claims, 9 Drawing Sheets

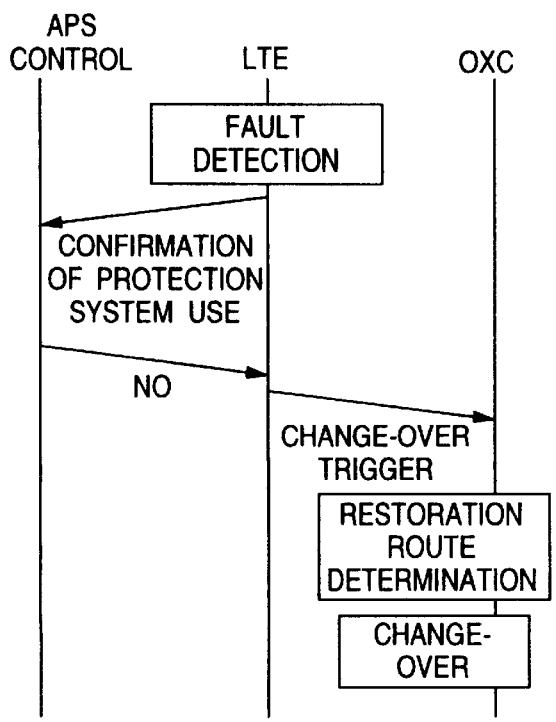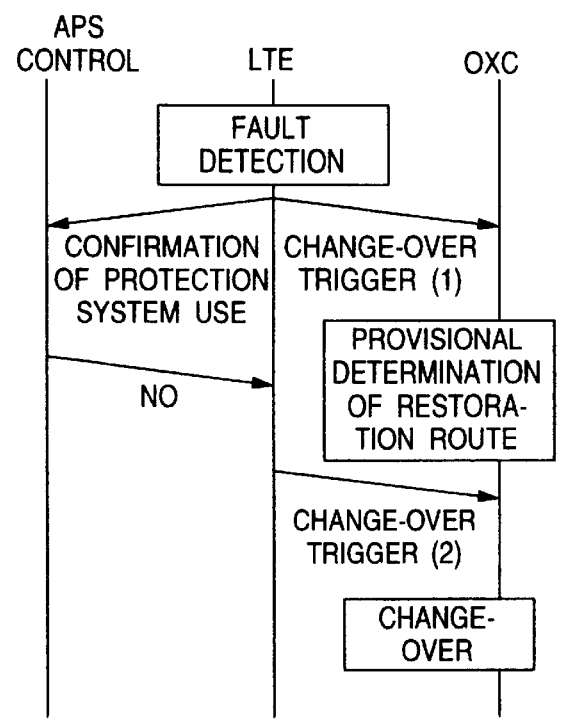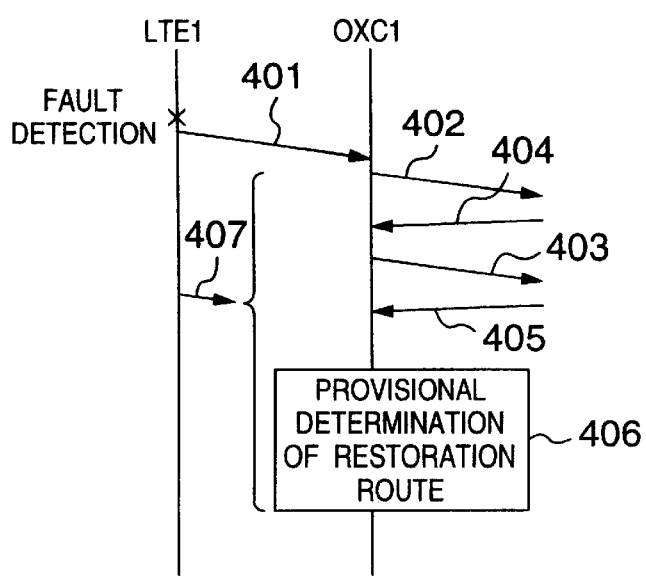

FAULT RESTORATION CONTROL METHOD AND IT'S APPARATUS IN A COMMUNICATION NETWORK

BACKGROUND OF THE INVENTION

The present invention relates to a fault restoration control method and apparatus thereof in a communication network, and in particular to a fault restoration control method suitable for a communication network using an optical cross-connect equipment for changing over from one optical fiber to another by using an optical switch.

Conventionally, in the case where a communication network was to be formed by using an optical fiber as a signal transmission line, an optical-electric signal converter and a line terminal equipment were disposed so as to be associated with each optical fiber in a node equipment for controlling communication. In the case where a transmission line fault such as degradation of characteristics of an optical fiber or breaking of an optical fiber occurred, the line terminal equipment detected that fault and changed the optical fiber over to a protection system.

Furthermore, in recent years, an equipment adapted to change over one optical fiber over to another by using an optical switch and called optical cross-connect equipment is disposed in the node equipment together with the line terminal equipment, and a communication network is formed by using such node equipments.

FIG. 11 is a block diagram showing an example of a communication network using optical cross-connect equipments according to a reference technique. FIG. 12 is a block diagram showing the configuration of a node equipment. FIG. 13 is a sequence diagram illustrating restoration operation from a fault in the communication network. With reference to FIGS. 11 and 12, N1 through N3 denote node equipments, LTE1 through LTE3 denote line terminal equipments, OXC1 through OXC3 denote optical cross-connect equipments, OF12, OF13 and OF23 optical fibers, 60 a fault detector, 61 an OXC change-over trigger generator, 62 an OXC change-over control signal transfer section, 63 a communication controller with respect to its own node OXC, 64 a communication controller with respect to other nodes, 65 a change-over route determining section, 66 an optical switch controller, 67 a change-over trigger acceptance section, 68 an other node information collector, 69 an other node OXC change-over request section, and 6A a communication controller, and 6B is equipment's own node information sending section.

The communication network shown in FIG. 11 is formed by interconnecting the three node equipments N1 through N3 via the optical fibers OF12, OF13, and OF23 serving as signal transmission lines. Although the illustrated communication network has three node equipments, a larger number of node equipments may be disposed and interconnected via optical fibers. As this communication network, any communication network may be used so long as at least two node equipments are interconnected by interconnection between the node equipments or optical cross-connect equipments. Each of the node equipments N1 through N3 is formed by a line terminal equipment LTE and an optical cross-connect equipment OXC as shown in FIG. 12.

The line terminal equipment LTE has a control function of signal transmission between node equipments, and control functions such as commanding the optical cross-connect equipment to change one optical fiber over to another in response to degradation of characteristics of the optical fiber or breaking of the optical fiber. Specifically, the line terminal equipment LTE is formed so as to have the fault detector 60, the OXC change-over trigger generator 61, the OXC change-over control signal transfer section 62, the communication controller 63 with respect to its own node OXC, and the communication controller 64 with respect to other nodes, as shown in FIG. 12.

The optical cross-connect equipment OXC has a function of conducting a change-over of one optical fiber serving as a transmission line to another by switching an optical switch disposed therein in response to a command given by the line terminal equipment. Specifically, the optical cross-connect equipment OXC is formed so as to have the restoration route determining section 65, the optical switch controller 66, the change-over trigger acceptance section 67, the other node information collector 68, the other node OXC change-over request section 69, the communication controller 6A and equipment's own node sending section 6B as shown in FIG. 12.

The configuration of the line terminal equipment LTE and the optical cross-connect equipment OXC shown in FIG. 12 represents only a configuration required for restoration from a fault. As for functions for the normal signal transmission, functions similar to the reference technique are provided.

It is now assumed in the node equipments configured as described above and a communication network including such node equipments that a node equipment N1 and a node equipment N2 transmit and receive a signal via an optical fiber OF12 interconnecting them and the line terminal equipment LTE1 included in the node equipment N1 has detected occurrence of a fault in the optical fiber OF12. In this case, the line terminal equipment LTE1 exchanges control information for restoration from the fault with other node equipments, thereby collects node information of other node equipments, and delivers the collected node information of other node equipments to the optical cross-connect equipment OXC1. The optical cross-connect equipment OXC1 determines a transmission route, changes over the transmission line from the optical fiber OF12 to another optical fiber, and conducts restoration from the fault.

Such an operation for restoration from a fault will now be described by referring to a sequence shown in FIG. 13. It is now assumed that a fault has occurred in the optical fiber OF12 interconnecting the node equipment N1 and the node equipment N2 when the node equipment N1 and the node equipment N2 are transmitting and receiving signals via the optical fiber OF12, and a route is then formed between the node equipment N1 and the node equipment N2 as a restoration route via the optical fiber OF13, the node equipment N3, and the optical fiber OF23. FIG. 13 shows an example in such a case.

(1) Upon detecting the occurrence of a fault in the optical fiber OF12, the line terminal equipment LTE1 in the node equipment N1 requests the optical cross-connect equipment OXC1 included in its own node equipment to change over from the optical fiber OF12. Upon receiving this request, the optical cross-connect equipment OXC1 requests the line terminal equipment LTE1 to collect node information (steps 701 and 702).

(2) The line terminal equipment LTE1 requests line terminal equipments of other node equipments, i.e., the line terminal equipments LTE2 and LTE3 respectively of the node equipments N2 and N3 in this case, to transfer the node information (steps 703 and 704).

(3) Upon receiving the node information transfer request, the line terminal equipments LTE2 and LTE3 respectively of the node equipments N2 and N3 collects node information from the optical cross-connect equipments OXC2 and OXC3 of its own node equipment and transfer that node information to the line terminal equipment LTE1 (steps 705 through 710).

(4) The line terminal equipment LTE1 delivers the transferred node information of the node equipments N2 and N3 to the optical cross-connect equipment OXC1 included in its own node equipment as answer information. On the basis of each node information thus delivered, the optical cross-connect equipment OXC1 determines a restoration route thereto. Together with the route information thus determined, the optical cross-connect equipment OXC1 then transmits a change-over request to the line terminal equipment LTE1 (steps 711 through 714).

(5) The line terminal equipment LTE1 commands the line terminal equipments LTE2 and LTE3 respectively of the node equipments N2 and N3 to conduct change-over operations complying with the determined route information. Each of the line terminal equipments LTE2 and LTE3 commands the optical cross-connect equipment OXC2 or OXC3 included in its own node equipment to conduct the change-over complying with the command given by the line terminal equipment LTE1 (steps 715 through 718).

(6) Each of the optical cross-connect equipments OXC1 through OXC3 included in respective node equipments conducts optical switch change-over in its own equipment in order to form the determined route. This change-over is conducted by respective equipments in aligned timing. Furthermore, the optical cross-connect equipments OXC2 and OXC3 report the completion of the change-over to the line terminal equipment LTE1 of the node equipment N1 via the line terminal equipments LTE2 and LTE3 (steps 719 through 725).

(7) The line terminal equipment LTE1 of the node equipment N1 reports the completion of the optical fiber change-over in the optical cross-connect equipments OXC2 and OXC3 to the optical cross-connect equipment OXC1 included in its own node equipment (steps 726 and 727).

In the case where a fault has occurred in the optical fiber OF12, the restoration route connecting the ru node equipment N1 to the node equipment N2 via the optical fiber OF13, the node equipment N3, and the optical fiber OF23 can be formed owing to the above described processing.

By the way, in the above described processing, the processing for collecting the node information of other node equipments conducted by the line terminal equipment LTE1 at the steps 703 and 704 is conducted for all node equipments included in the communication network. The optical fiber change-over commands at the steps 715 and 716 are given to only the node equipments concerning the determined restoration route.

The above described processing is conducted by exchanging fault restoration control information between the node equipments by using headers of the Synchronous Digital Hierarchy (SDH) which is an international standard. In this case, the header portion cannot be analyzed in the optical cross-connect equipment OXC. Therefore, all of the control signals must be let flow via the line terminal equipment LTE as described above with reference to FIG. 13 and as represented by broken lines in FIG. 11.

In general, exchange of the fault restoration control information between the nodes using a header is conducted by using a data communication channel (DCC) included in the header. Instead, however, it may be conducted by using a different method, such as providing, between the node equipments, a network dedicated to control signals. In this case as well, however, the exchange of the control signal with another node equipment cannot be conducted without passing the control signal through the line terminal equipment LTE once. The control signal cannot be sent directly to the optical cross-connect equipment of another node equipment.

As described above, the exchange of the fault restoration control information between the nodes is conducted via the line terminal equipment in the reference technique. This aims at efficiently utilizing K1 bytes and K2 bytes already prepared in the header of the SDH to transmit the change-over signals between the line terminal equipments LTEs.

In the above described reference technique, the exchange of the fault restoration control information between the nodes is conducted via the line terminal equipment LTE. In the case where a node equipment lacking an equipment capable of interpreting the header of the SDH, such as the line terminal equipment LTE, exists as a node equipment in a communication network, the exchange of the control information with the node equipment cannot be conducted. For example, in the case where a node equipment formed by only the optical cross-connect equipment OXC exists as a node equipment in a communication network, the exchange of the control information with the node equipment cannot be conducted. The above described reference technique has such a problem.

In the above described reference technique, it is necessary to prescribe an interface between the line terminal equipment LTE and the optical cross-connect equipment OXC even in one node equipment. This causes an increase of an interface for exchanging the fault restoration control information. The above described reference technique thus has a problem of a complicated configuration of the node equipment.

SUMMARY OF THE INVENTION

An object of the present invention is to provide a fault restoration control method of a communication network capable of solving the above described problems of the reference technique. Particularly, the present invention is capable of exchanging the fault restoration control information between the nodes without passing it through the line terminal equipment LTE. Further, the present invention is capable of exchanging the fault restoration control information with a node equipment lacking a line terminal equipment LTE and forming an optimum restoration route even in the case where the node equipment exists in the communication network. Thus, the present invention is such capable of reducing the interface between the line terminal equipment LTE and the optical cross-connect equipment OXC in one node equipment and simplifying the configuration of the node equipment.

The above described object is achieved by a method for restoration from a fault in a communication network formed by interconnecting a plurality of nodes including at least one set of node equipment each including a line terminal equipment and an optical cross-connect equipment, via a plurality of transmission lines using optical fibers. The method of the present invention includes the steps of: causing a line terminal equipment of at least one set of node equipment to detect a fault in an optical fiber under communication, and in response to the detected fault, give a command functioning as trigger for optical fiber change-over to an optical cross-connect equipment included in the node equipment; and causing the optical cross-connect equipment given the command functioning as the trigger to exchange change-over control information indicating optical switch setting situation between the optical cross-connect equipment given the command and optical cross-connect equipments included in other node equipments, and form a restoration route.

Furthermore, the above described object is achieved by a method including the step of causing the optical cross-connect equipment to collect node information indicating whether a change-over route is usable from optical cross-connect equipments included in other node equipments, determine a restoration route based on the node information, and request each of optical cross-connect equipments included in specific node equipments concerning the determined restoration route to change-over one transmission line using an optical fiber to another.

Furthermore, the above described object is achieved by a method for restoration from a fault in a communication network formed by interconnecting a plurality of nodes including at least one set of node equipment each including a line terminal equipment and an optical cross-connect equipment, via a plurality of transmission lines using optical fibers including a protection system. The method of the present invention includes the steps of: causing a line terminal equipment to detect a fault in an optical fiber under communication, and, in response to the detected fault, inform an optical cross-connect equipment included in its own node equipment of the occurrence of the fault, and determine whether a change-over to the protection system should be conducted or a change-over to a restoration route passing through another node equipment should be conducted; causing the informed optical cross-connect equipment to exchange change-over control information between the informed optical cross-connect equipment and optical cross-connect equipments included in other node equipments, and determine a restoration route provisionally; when the line terminal equipment has decided that a change-over to a restoration route passing through another node equipment should be conducted, causing the line terminal equipment to give a command functioning as trigger for optical fiber change-over to the optical cross-connect equipment included in its own node equipment; and causing the optical cross-connect equipment given the command to form a transmission line using the provisionally determined restoration route.

BRIEF DESCRIPTION OF THE DRAWINGS

FIG. 8 is a diagram showing a change-over sequence used when a fault has been detected, in a reference technique to be compared with the present invention;

FIG. 9 is a change-over sequence diagram in an embodiment of the present invention;

FIG. 10 is a diagram showing another example of a change-over sequence diagram in an embodiment of the present invention;

DESCRIPTION OF THE PREFERRED EMBODIMENTS

Hereafter, an embodiment of a fault restoration control method of a communication network according to the present invention will be described in detail by referring to drawing.

Figure 1:
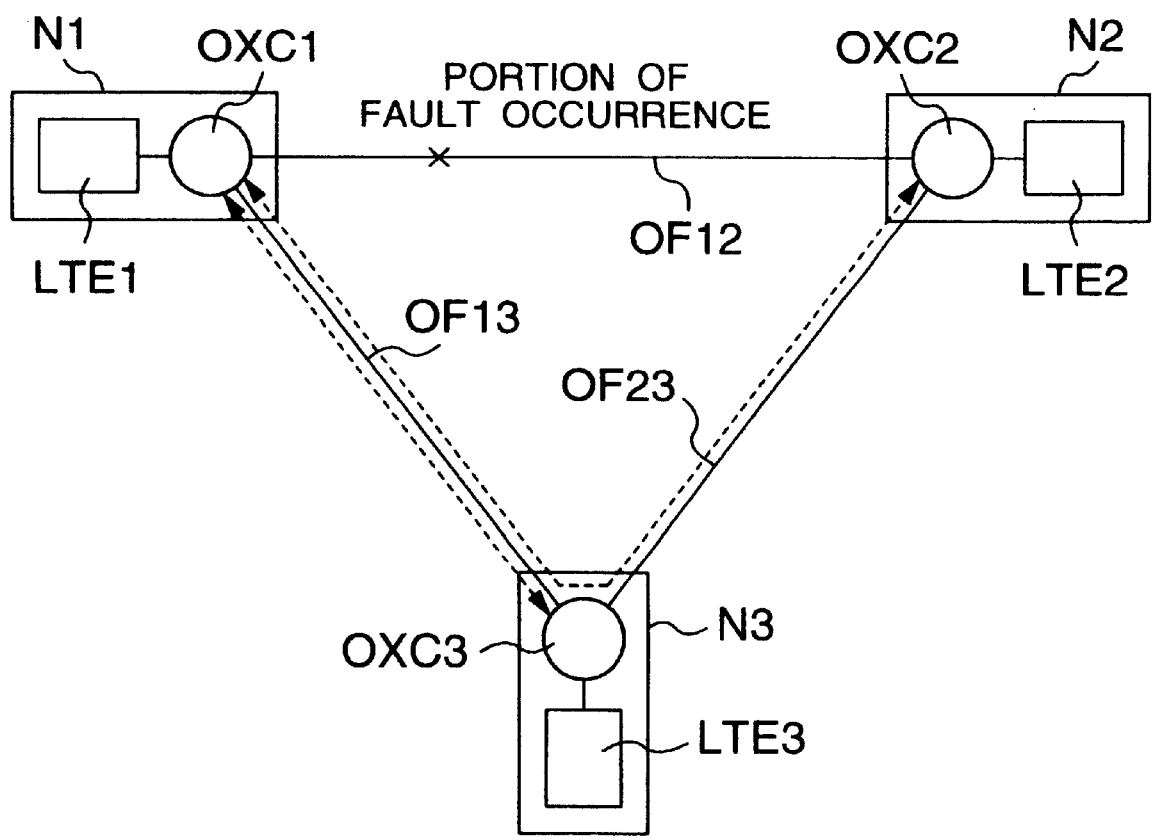
FIG. 1 is a block diagram showing the configuration of a communication network to which a fault restoration control method of an embodiment according to the present invention has been applied, and showing the flow of fault restoration control information therein.
Figure 2:
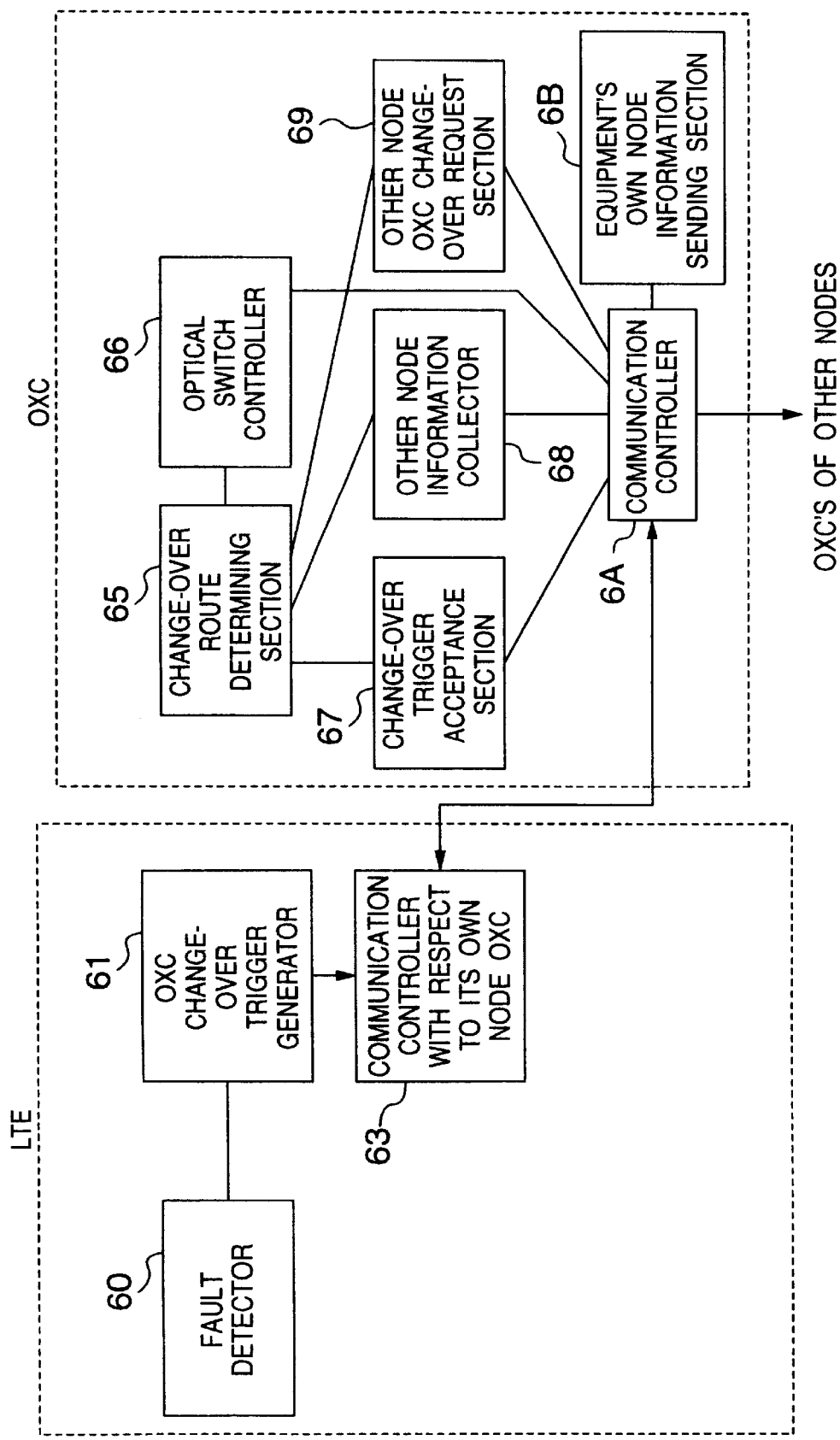
FIG. 2 is a block diagram showing the configuration of a node equipment shown in FIG. 1.
Figure 3:
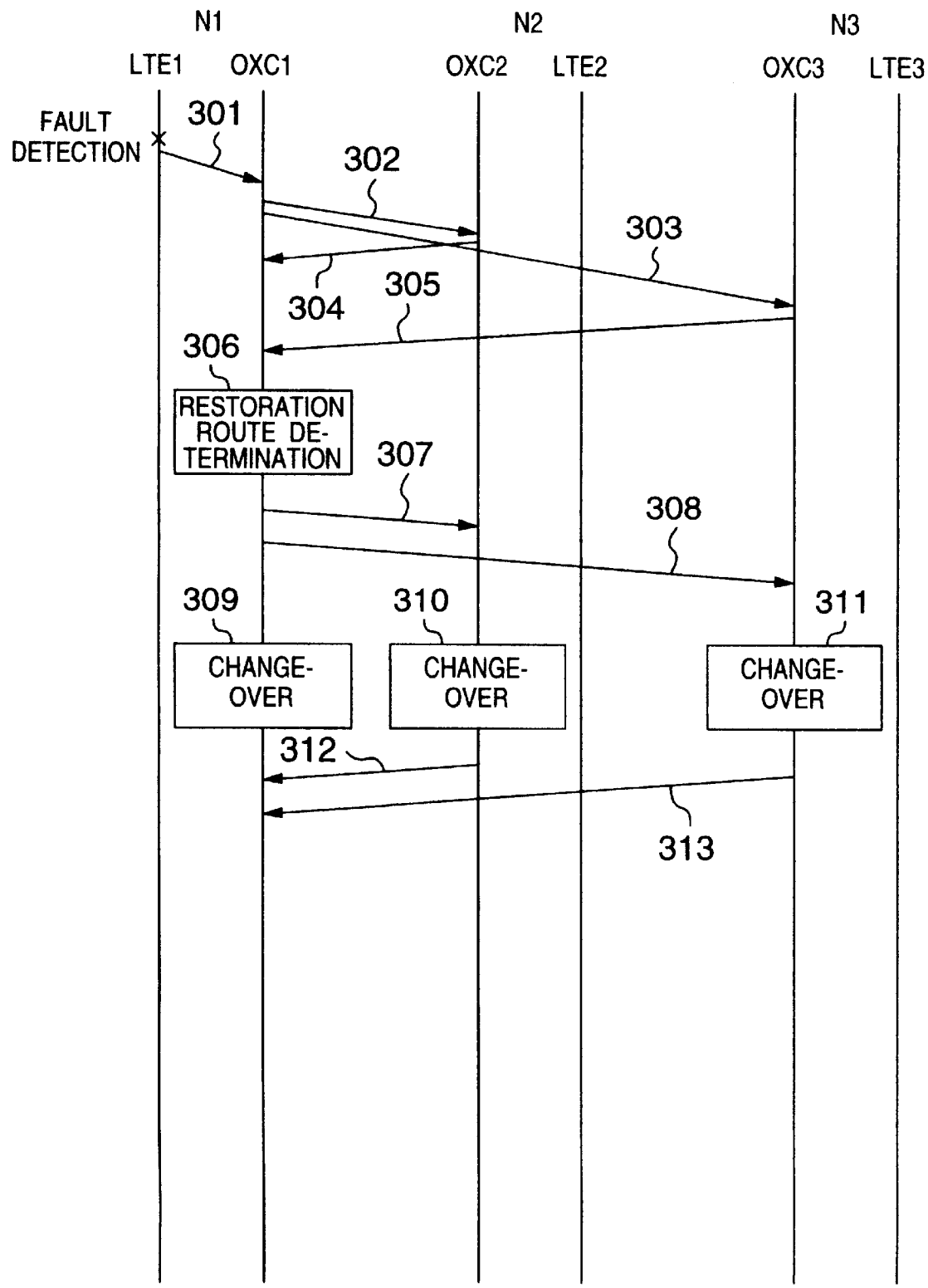
FIG. 3 is a sequence diagram illustrating operation of the embodiment shown in FIGS. 1 and 2.

FIG. 1 is a block diagram showing the configuration of a communication network to which a fault restoration control method according to the present invention has been applied, and showing the flow of fault restoration control information therein. FIG. 2 is a block diagram showing the configuration of a node equipment. FIG. 3 is a sequence diagram illustrating its operation. Characters in FIGS. 1 and 2 are the same as those shown in FIGS. 11 and 12.

Figure 11:
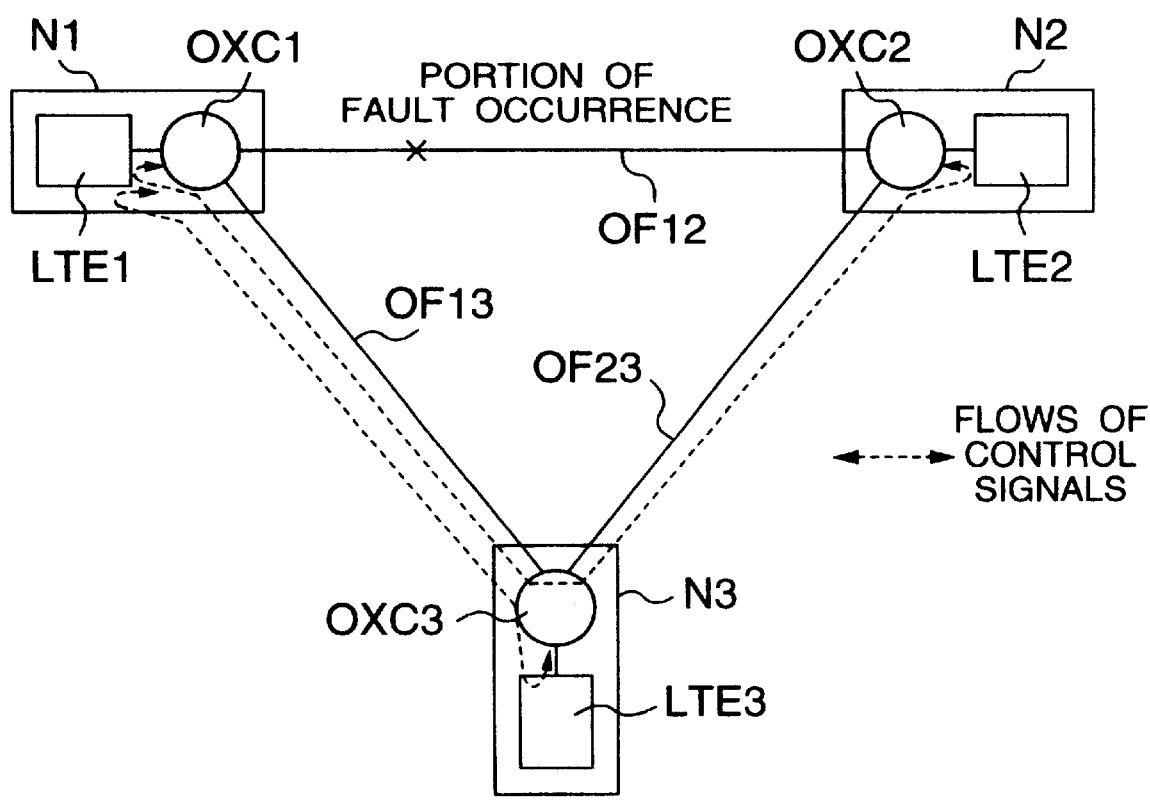
FIG. 11 is a configuration block diagram of a communication network using optical cross-connect equipments of the reference technique.

In the same way as the reference technique described by referring to FIG. 11, the communication network shown in FIG. 1 is formed by three node equipments N1 through N3 interconnected by optical fibers OF12, OF13 and OF23 serving as signal transmission lines. In one embodiment of the present invention as well, the communication network may be formed by disposing a larger number of node equipments or optical cross-connect equipments between at least two node equipments and interconnecting those node equipments by optical fibers.

As shown in FIG. 2, each of the node equipments N1 through N3 is formed so as to have a line terminal equipment and an optical cross-connect equipment OXC. The line terminal equipment LTE has a control function of signal transmission between node equipments, and control functions such as commanding the optical cross-connect equipment to change one optical fiber over to another in response to degradation of characteristics of the optical fiber or breaking of the optical fiber. Specifically, the line terminal equipment LTE is formed so as to have the fault detector 60, the OXC change-over trigger generator 61, and the communication controller 63 with respect to its own node OXC as shown in FIG. 2.

The fault detector 60 is used to detect a fault of a fiber of an active system. The OXC change-over trigger generator 61 is used to detect a fault and generate trigger for a change-over to the OXC. The communication controller 63 with respect to its own node OXC is used to perform communication between its own node and the OXC.

As for other functions shown in FIG. 2, a change-over route determining section 65 is used to determine a shortest usable route out of some routes. Once a change-over route is determined, a SW change-over route is also determined. Therefore, an optical switch controller 66 is used to control optical switches on the basis of the determined SW change-over route. A change-over trigger acceptance section 67 is used to inform each component that the change-over trigger has occurred and start cross-connection. An other node information collector 68 is used to collect node information such as operation states of optical switches according to the route. An other node OXC change-over request section 69 is used to request other nodes to change over switches according to the route determined by the change-over route determining section 65. A communication controller 6A is used to conduct communication control of its own node and other nodes. An equipment's own node information sending section 6B is used to conduct function checks of fibers connected to its own node.

Figure 12:
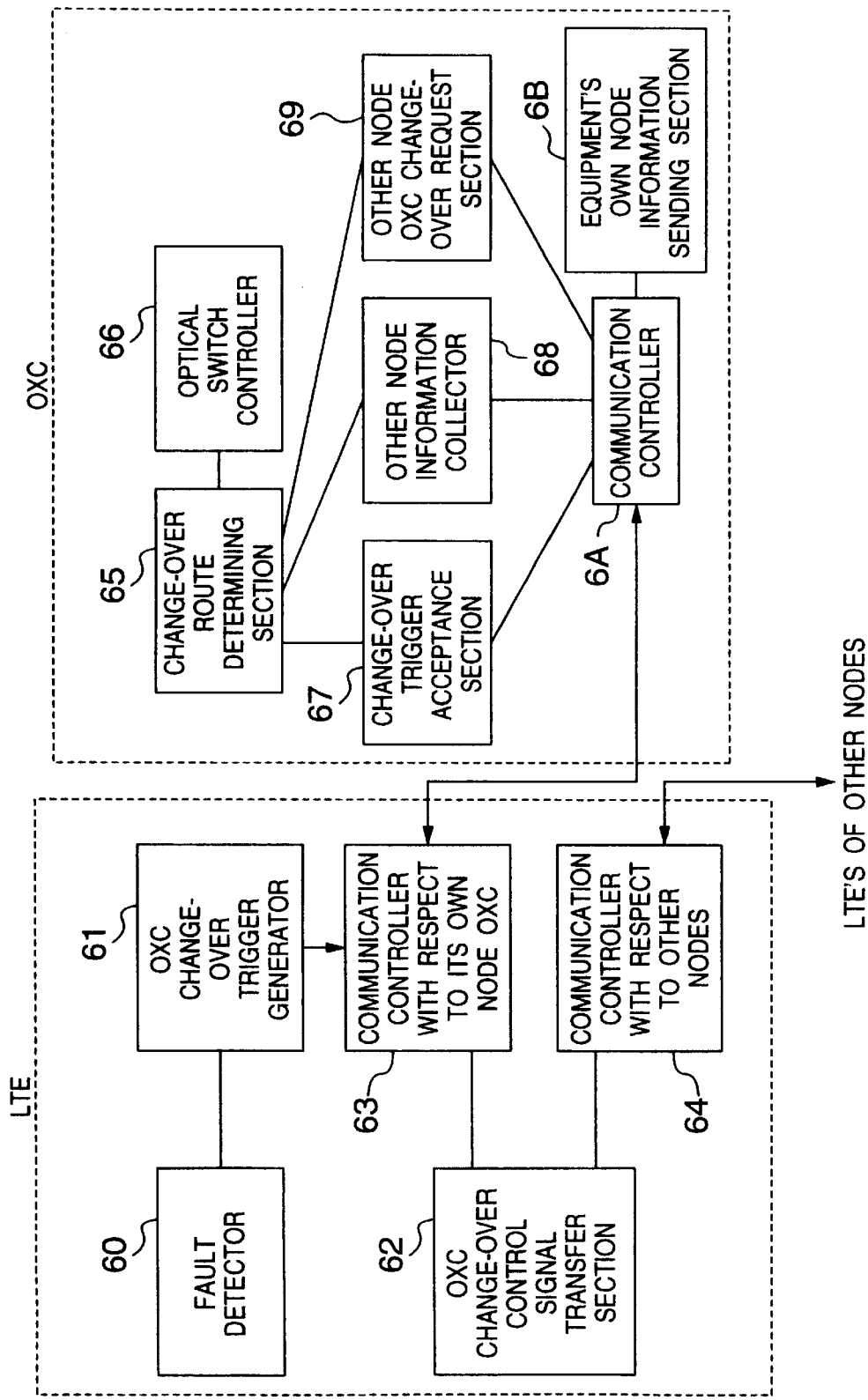
FIG. 12 is a block diagram showing the configuration of a node equipment shown in FIG. 11.
Figure 13:
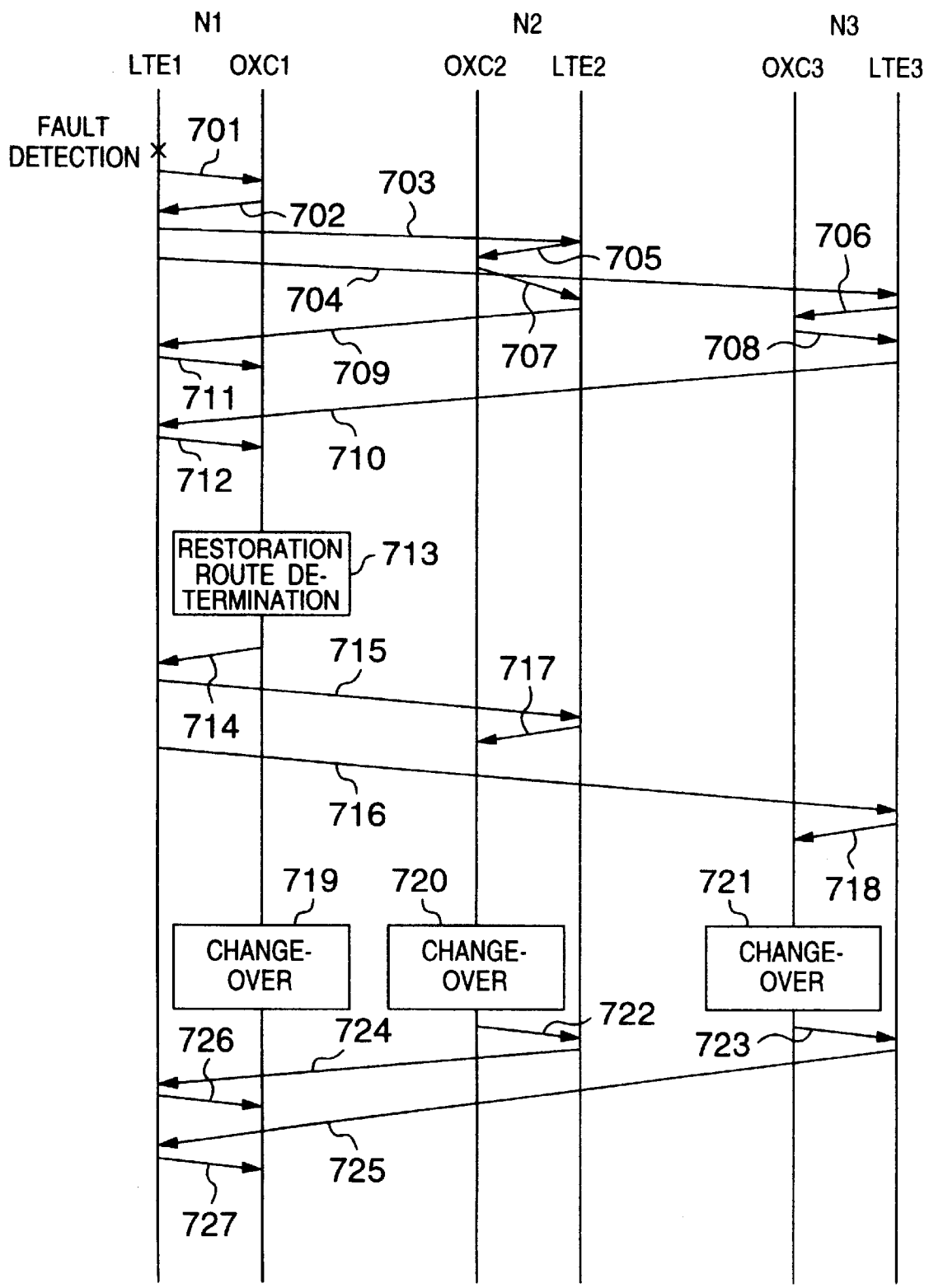
FIG. 13 is a sequence diagram illustrating operation of the reference technique shown in FIGS. 11 and 12.

The configuration of the optical cross-connect equipment OXC is obtained by removing the OXC change-over control signal transfer section 62 and the communication controller with respect to other nodes 64 from the configuration of the line terminal equipment LTE of the reference technique described by referring to FIG. 12. The optical cross-connect equipment OXC has a function of conducting a change-over of one optical fiber serving as a transmission line to another by switching an optical switch disposed therein in response to a command given by the line terminal equipment. Specifically, the optical cross-connect equipment OXC has a configuration as shown in FIG. 2. This configuration is similar to the configuration of the optical cross-connect equipment OXC described by referring to FIG. 12.

The configuration of the line terminal equipment LTE and the optical cross-connect equipment OXC shown in FIG. 2 represents only a configuration required for restoration from a fault in the same way as the foregoing description with reference to FIG. 12. As for functions for the normal signal transmission, functions similar to the reference technique are provided.

In an embodiment of the present invention, a line terminal equipment LTE in a node equipment disposed in a communication network which has detected a fault in an optical fiber under communication gives a command functioning as trigger for optical fiber change-over to an optical cross-connect equipment OXC included in its own node equipment. Thereafter, the optical cross-connect equipment OXC itself conducts all control for the optical fiber change-over by exchanging change-over control information between itself and an optical cross-connect equipment included in another node equipment or an optical cross-connect equipment standing alone.

In the foregoing description, the control information exchanged between the optical cross-connect equipments includes a portion of fault occurrence, identification (ID) information of a pertinent optical cross-connect equipment, and a restoration route. Transfer of these kinds of control information is conducted by using a communication network such as a LAN which is separately installed and not illustrated, or by using an optical signal having a wavelength different from an ordinary wavelength to indicate the transfer of the control information.

A signal outputted from the line terminal equipment to the optical cross-connect equipment as the change-over trigger may include contents of protection switching bytes (K1, K2) of the SDH overhead.

Assuming now in the node equipments configured as described above and a communication network including such node equipments that a node equipment N1 and a node equipment N2 transmit and receive a signal via an optical fiber OF12 interconnecting them and the line terminal equipment LTE1 included in the node equipment N1 has detected occurrence of a fault in the optical fiber OF12, an operation for restoration from a fault will now be described by referring to a sequence shown in FIG. 3.

(1) If the fault detector 60 of the line terminal equipment LTE1 detects the occurrence of a fault in the optical fiber OF12, the OXC change-over trigger generator 61 generates change-over trigger toward the optical cross-connect equipment OXC1 included in its own node equipment N1 and requests optical fiber change-over through the communication controller 63 (step 301). Upon receiving it in the optical cross-connect equipment OXC1 via the communication controller 6A, the other node information collector 68 requests optical cross-connect equipments OXC2 and OXC3 respectively of other node equipments N2 and N3 to collect node information via the communication controller 6A (steps 302 and 303).

(2) Upon being requested to collect the node information, the equipment's own node information sending section 6B of the optical cross-connect equipments OXC2 and OXC3 respectively of the other node equipments N2 and N3 collects the node information and transfers the node information to the optical cross-connect equipment OXC1 of the node equipment N1 (steps 304 and 305).

(3) The other node information collector 68 in the optical cross-connect equipment OXC1 of the node equipment N1 receives the node information from the optical cross-connect equipments OXC2 and OXC3 respectively of the other node equipments N2 and N3. On the basis of the node information, the change-over route determining section 65 determines a restoration route (step 306), and generates optical fiber change-over information for each node equipment. The other node OXC change-over request section 69 requests the optical cross-connect equipments OXC2 and OXC3 respectively of the node equipments N2 and N3 to conduct the optical fiber change-over (steps 307 and 308).

The change-over of its own node is conducted by the optical switch controller 66 (step 309).

(4) In each of the optical cross-connect equipments OXC2 and OXC3 respectively of the node equipments N2 and N3, the optical switch controller 66 conducts the optical fiber change-over in order to form he determined route (steps 310 and 311). The optical cross-connect equipments OXC2 and OXC3 report the completion of the change-over to the other node information collector 68 of the node equipment N1 (steps 312 and 313).

In the case where a fault has occurred in the optical fiber OF12, the restoration route connecting the node equipment N1 to the node equipment N2 via the optical fiber OF13, the node equipment N3, and the optical fiber OF23 can be formed owing to the above described processing.

By the way, in the above described processing as well, the processing for collecting the node information of other node equipments conducted by the optical cross-connect equipment OXC1 at the steps 302 through w 305 is conducted for all node equipments included in the communication network. The optical fiber change-over commands at the steps 307 and 308 are given to only the node equipments concerning the determined restoration route.

An embodiment of the present invention has heretofore been described. When the line terminal equipment LTE in the node equipment provided in the communication network has detected a fault in an optical fiber under communication, the line terminal equipment LTE conducts only giving a command functioning as optical fiber change-over trigger to the optical cross-connect equipment OXC included in its own node equipment. The optical cross-connect equipment OXC itself conducts all of subsequent control for the optical fiber change-over by exchanging the change-over control information between itself and the optical cross-connect equipments in the other node equipments. Therefore, the exchange of the control information can be conducted without intervention of any line terminal equipments LTE, and the time required until formation of the restoration route can be shortened.

Even in the case where a node equipment formed by only an optical cross-connect equipment OXC is included in a communication network, the above described embodiment of the present invention makes it possible to form a restoration route including that node.

Furthermore, according to the above described embodiment of the present invention, an interface is set directly between the optical cross-connect equipments OXCs. Therefore, a stipulation of an interface between the line terminal equipment LTE and the optical cross-connect equipment OXC and a stipulation of an interface between the optical cross-connect equipments OXCs can be separated according to their respective functions. As a result, respective interface stipulations can be simplified.

Figure 4:
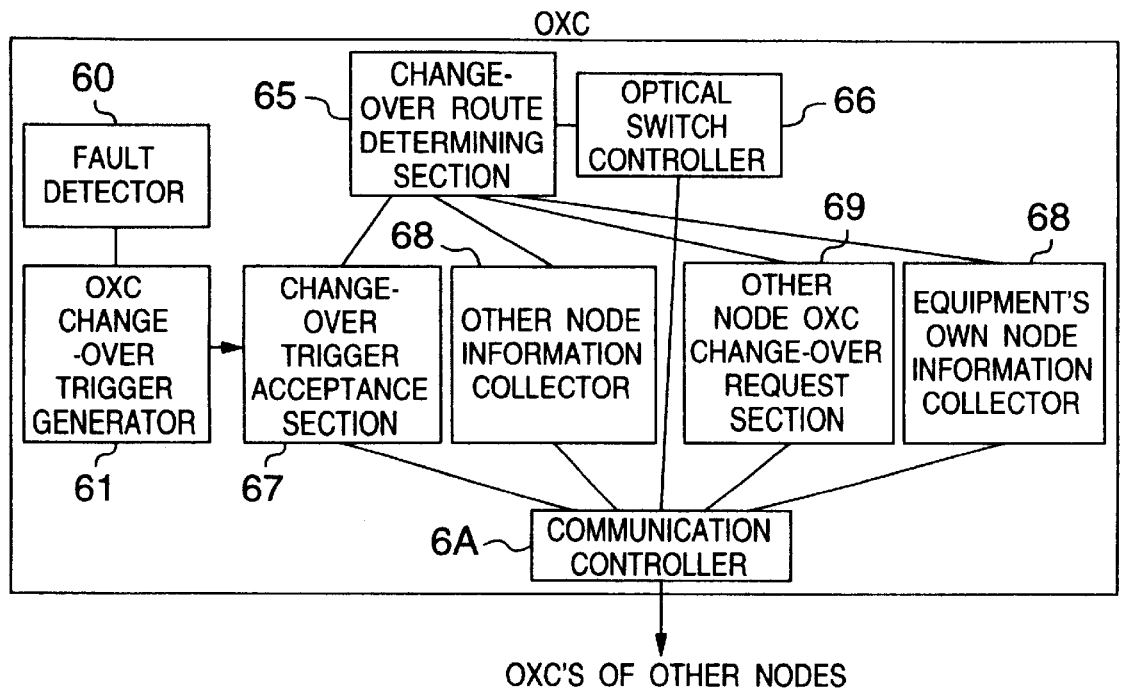
FIG. 4 is a diagram showing another example of a configuration of an optical cross-connect equipment.

As a variant of the optical cross-connect equipment OXC, the fault detector 60 and the OXC change-over trigger generator 61 can be added to the example of the configuration shown in FIG. 2 as shown in FIG. 4.

In the optical cross-connect equipment OXC of the variant shown in FIG. 4, the optical cross-connect equipment OXC itself has the fault detection function and generates the change-over trigger. Therefore, it becomes unnecessary to receive the change-over trigger from the line terminal equipment LTE.

The optical cross-connect equipment OXC thus configured can be connected between other nodes as a node standing alone in the network.

When a fault has occurred in an optical fiber functioning as a transmission line interconnecting node equipments, a restoration route passing through another node equipment is formed in the above described embodiment of the present invention. In general, however, a plurality of optical fibers are installed between node equipments, and thus an optical fiber of protection system is provided. When a line terminal equipment LTE in each node equipment has detected a fault of an optical fiber which is being used for information transmission, the line terminal equipment LTE first conducts a change-over to the optical fiber of the protection system.

Hereafter, operation conducted in the case where there is a protection system of a line terminal equipment LTE will be described.

Figure 5:
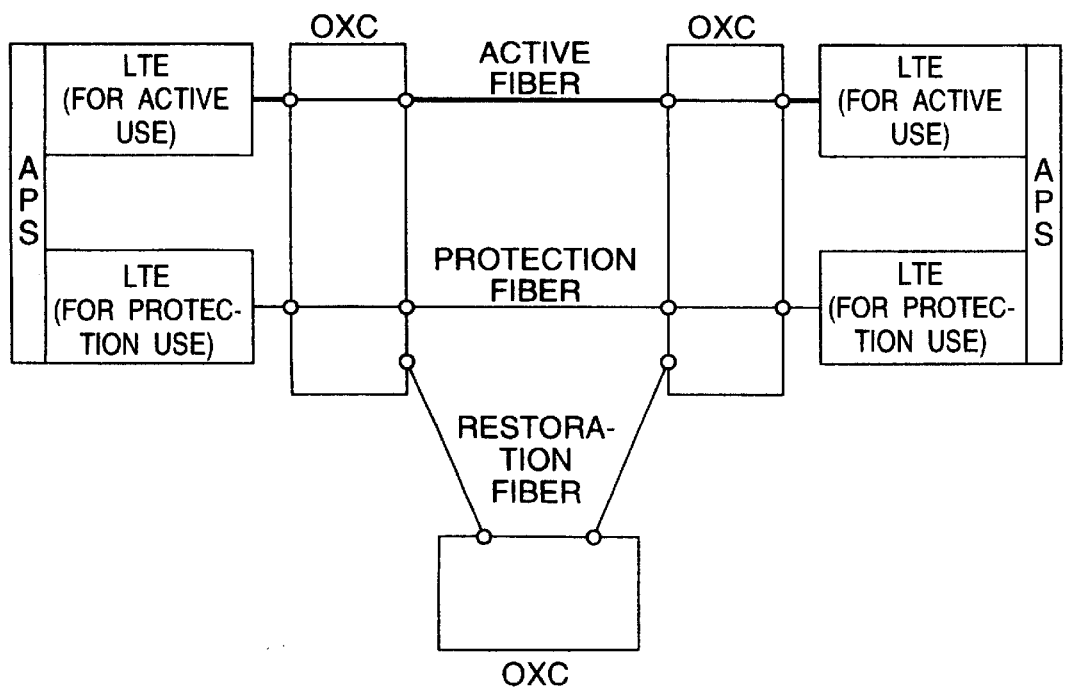
FIG. 5 is a block diagram showing operation conducted at the normal time in the case where there is a protection system of a line terminal equipment.

(1) At the normal time, signals flow through an active fiber as shown in FIG. 5. The protection system is not used, or the same signal as the active system carries, or extra traffic (low priority signals which are not ensured communication at the time of occurrence of a fault) flow through the fiber of the protection system.

Figure 6:
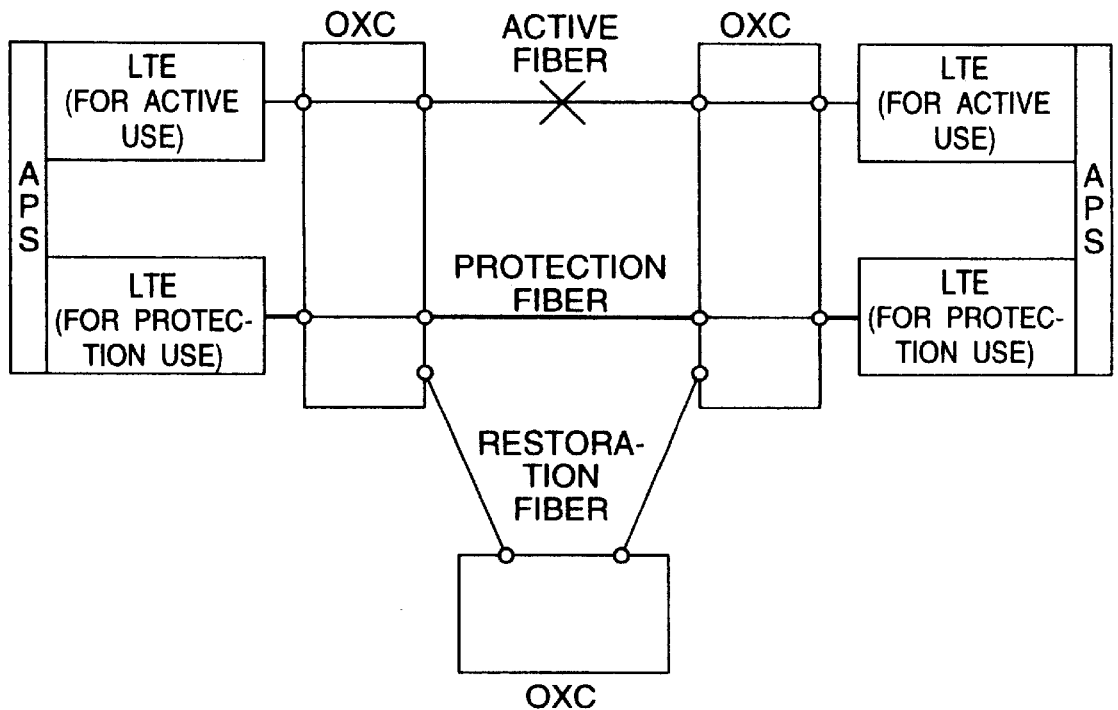
FIG. 6 is a block diagram showing operation conducted when a fault has occurred in an active system equipment/fiber in the configuration of FIG. 5.

(2) At the time of a fault of an equipment/fiber of active system, an electric change-over to a protection system is conducted by change-over systems (APSs) of the line terminal equipments LTEs as exemplified in FIG. 6.

Figure 7:
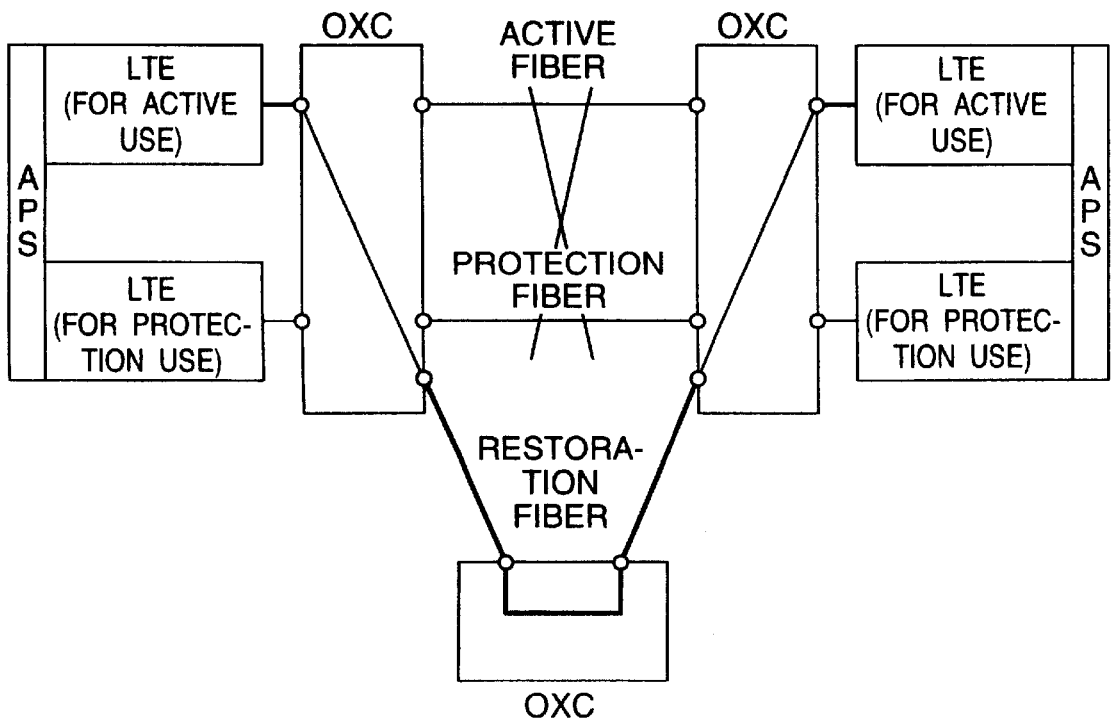
FIG. 7 is a block diagram showing operation conducted in the configuration of FIG. 5 in the case where a change-over to a restoration fiber has been effected.

(3) In the case where a change-over to the protection system cannot be conducted due to an APS failure, a protection system abnormality, or maintenance, a change-over to a restoration fiber is conducted by the optical cross-connect equipments OXCs as exemplified in FIG. 7.

Accordingly, in the case where there is a fault in APS, in the optical fiber of the protection system as well, or in the case where the number of fault optical fibers is larger than number of the optical fiber prepared as the protection system, or in the event a fault is detected in the active system and the optical fiber prepared as the protection system can not be utilized since they are under maintenance, the line terminal equipment LTE sends change over trigger to the optical cross-connect equipment OXC to form the restoration route.

An example as a reference for a switching sequence, in the case where above described embodiment of the present invention is applied to such a communication network that a plurality of optical fibers are installed between node equipments and an optical fiber of protection system is provided, is shown in FIG. 8.

According to the sequence as shown in FIG. 8, in the event where the optical fibers prepared as the protection system can be used then the line terminal equipment carry out change-over to the optical fibers prepared as the protection system by APS control, and shut down by optical cross-connect is not to be carried out. Furthermore, in the event where the optical fibers prepared as the protection system can not be used, then change-over trigger for forming a restoration route is transmitted to optical cross-connect equipment OXC, and a restoration route via other node equipment is formed. Therefore, in some cases, it takes a lot of time until the restoration route is formed after receiving change-over trigger indicating whether restoration by optical cross-connect equipment OXC is necessary or not.

FIG. 9 is a sequence diagram showing the operation of another embodiment of the present invention capable of shortening the time required until the restoration route is formed even in the above described case. In FIG. 10, it is focused on a communication with OXC in other node, and will be explained in the following. The configuration of the communication network and the state of the fault in the present embodiment are the same as those of the above described embodiment. In FIG. 10, only a part of the operation of the node equipment N1 is shown.

Both of these sequences show the case where the fault detection is conducted by a line terminal equipment LTE. However, similar sequences can be used also in the case of such a configuration that an optical cross-connect equipment OXC itself detects a fault.

(1) Upon detecting occurrence of a fault in the optical fiber OF12, the line terminal equipment LTE1 in the node equipment N1 reports the occurrence of the fault to the optical cross-connect equipment OXC1 in its own node equipment N1. Upon receiving the report, the optical cross-connect equipment OXC1 requests optical cross-connect equipments OXC2 and OXC3 respectively of other node equipments N2 and N3 in the communication network to collect node information (steps 401 through 403).

(2) Upon being requested to collect the node information, the optical cross-connect equipments OXC2 and OXC3 respectively of the other node equipments N2 and N3 collect the node information and transfer the information to the optical cross-connect equipment OXC1 of the node equipment N1 (steps 404 and 405).

(3) Upon receiving the node information from the optical cross-connect equipments OXC2 and OXC3 respectively of the other node equipments N2 and N3, the optical cross-connect equipment OXC1 of the node equipment N1 determines a restoration route for the active system provisionally on the basis of the node information (step 406).

(4) While the optical cross-connect equipment OXC1 is conducting the above described processing, the line terminal equipment LTE1 determines whether a change-over to the optical fiber of the protection system should be conducted or the line terminal equipment should send change-over trigger for forming a restoration route to the optical cross-connect equipment OXC1 in order to form a restoration route through another node equipment. That is, in FIG. 9, it is recognized whether the protection system can be utilized or not. In the case where it has been decided that the restoration route passing through the other node equipment should be formed, accordingly, in the event when the protection system can not be utilized, the line terminal equipment LTE1 sends change-over trigger for forming the restoration route to the optical cross-connect equipment OXC1. This trigger may be sent at any time (step 407).

(5) Upon receiving the change-over trigger, the optical cross-connect equipment OXC1 causes the provisionally determined restoration route to become a formal restoration route since then. By processing similar to that of the step 307 and subsequent steps described with reference to FIG. 3, the restoration route is formed.

Another embodiment of the present invention has been described, In the case where the present invention is applied to such a communication network that a plurality of optical fibers are installed between node equipments and an optical fiber of protection system is provided, the optical cross-connect equipment OXC collects the node information of other node equipments and provisionally determines a restoration route while the line terminal equipment LTE is determining whether a change-over to the optical fiber of the protection system should be conducted or a restoration route should be formed through another node equipment. Therefore, the time required until the restoration route is formed can be shortened.

Furthermore, in the case where the fiber of the protection system breaks at the same time that the fiber of the active system breaks (the case where the signal of the protection system is multiplexed in waveform with the signal of the active system and accommodated in the active fiber corresponds to this), it is obvious that the APS cannot be used. If the scheme of this embodiment is used, therefore, the change-over can be conducted by the optical cross-connect equipments OXCs without wasting time to confirm the use of the protection system. In this case, the change-over trigger can be omitted, resulting in a higher speed.

According to an embodiment of the present invention as heretofore described, when a line terminal equipment in a node equipment has detected a fault in an optical fiber under communication, the line terminal equipment need only give a command functioning as trigger for optical fiber change-over to an optical cross-connect equipment, and all subsequent control for the optical fiber change-over can be conducted by the optical cross-connect equipment itself without intervention of the line terminal equipment. As a result, the time required until a restoration route is formed can be shortened.

Furthermore, according to an embodiment of the present invention, even in the case where a node equipment formed by an optical cross-connect equipment alone is included in a communication network, a restoration route including that node can be formed.

Furthermore, according to an embodiment of the present invention, stipulations of an interface between a line terminal equipment and an optical cross-connect equipment and interface stipulations between optical cross-connect equipments can be separated according to respective functions. As a result, respective interface stipulations can be simplified.

The entire disclosure of Japanese Patent Application No. 9-40999 and No. 9-39238 including specification, claims, drawings and summary are incorporated herein by reference in its entirely.

What is claimed is:

1. A method for restoration from a fault in a communication network, said communication network being formed by interconnecting a plurality of nodes via a plurality of transmission lines using optical fibers, said plurality of nodes including at least one set of node equipment including a line terminal equipment and an optical cross-connect equipment, said method comprising the steps of:

causing a line terminal equipment of said at least one set of node equipment to terminate Synchronous Digital Hierarchy (SDH) to detect a fault in an optical fiber under communication, and in response to the detected fault, give a command functioning as a trigger for optical fiber change-over to an optical cross-connect equipment included in the node equipment; and causing said optical cross-connect equipment given said command functioning as the trigger to exchange change-over control information indicating optical switch setting situation between said optical cross-connect equipment given said command and optical cross-connect equipments included in other node equipments, and form a restoration route, wherein said command functioning as the trigger for optical fiber change-over comprises contents of protection switching bytes of an overhead signal of the SDH, and wherein said exchange of change-over control information is conducted by using an optical signal having a wavelength different from a normal wavelength used by said optical cross-connect equipments.

2. A method of restoration from a fault in a communication network, said communication network being formed by interconnecting a plurality of nodes via a plurality of transmission lines using optical fibers, said plurality of nodes including at least one set of node equipment including a line terminal equipment and an optical cross-connect equipment, said method comprising the steps of:

causing a line terminal equipment of said at least one set of node equipment to terminate Synchronous Digital Hierarchy (SDH) to detect a fault in an optical fiber under communication, and in response to the detected fault, give a command functioning as a trigger for optical fiber change-over to an optical cross-connect equipment included in the node equipment; and causing said optical cross-connect equipment given said command functioning as the trigger to exchange change-over control information indicating optical switch setting situation between said optical cross-connect equipment given said command and optical cross-connect equipments included in other node equipments, and form a restoration route, wherein said step of causing said optical cross-connect equipment to exchange change-over control information and form a restoration route comprises the step of causing said optical cross-connect equipment to collect node information indicating whether a change-over route is usable from optical cross-connect equipments included in other node equipments, and determine a restoration route based on said node information, wherein said command functioning as the trigger for optical fiber change-over comprises contents of protection switching bytes of an overhead signal of the SDH, and wherein said exchange of change-over control information is conducted by using an optical signal having a wavelength different from a normal wavelength used by said optical cross-connect equipments.

3. A method of restoration from a fault in a communication network, said communication network being formed by interconnecting a plurality of nodes via a plurality of transmission lines using optical fibers, said plurality of nodes including at least one set of node equipment including a line terminal equipment and an optical cross-connect equipment, said method comprising the steps of:

causing a line terminal equipment of said at least one set of node equipment to terminate Synchronous Digital Hierarchy (SDH) to detect a fault in an optical fiber under communication, and in response to the detected fault, give a command functioning as a trigger for optical fiber change-over to an optical cross-connect equipment included in the node equipment; and causing said optical cross-connect equipment given said command functioning as the trigger to exchange change-over control information indicating optical switch setting situation between said optical cross-connect equipment given said command and optical cross-connect equipments included in other node equipments, and form a restoration route, wherein said step of causing said optical cross-connect equipment to exchange change-over control information and form a restoration route comprises the step of causing said optical cross-connect equipment to collect node information indicating whether a change-over route is usable from optical cross-connect equipments included in other node equipments, and determine a restoration route based on said node information, wherein said step of causing said optical cross-connect equipment to exchange change-over control information and form a restoration route comprises the step of causing said optical cross-connect equipment to request each of optical cross-connect equipments included in specific node equipments concerning said determined restoration route to change-over one transmission line using an optical fiber to another, wherein said command functioning as the trigger for optical switching bytes of an overhead signal of the SDH, and wherein said exchange of change-over control information is conducted by using an optical signal having a wavelength different from a normal wavelength used by said optical cross-connect equipments.

4. A method for restoration from a fault in a communication network, said communication network being formed by interconnecting a plurality of nodes via a plurality of transmission lines using optical fibers, said plurality of transmission lines using optical fibers including a protection system, said plurality of nodes including at least one set of node equipment including a line terminal equipment and an optical cross-connect equipment, said method comprising the steps of:

causing said line terminal equipment to terminate Synchronous Digital Hierarchy (SDH) to detect a fault in an optical fiber under communication, and, in response to the detected fault, inform an optical cross-connect equipment included in its own node equipment of the occurrence of the fault, and determine whether a change-over to the protection system should be conducted or a change-over to a restoration route passing through another node equipment should be conducted;

causing said informed optical cross-connect equipment to exchange change-over control information between said informed optical cross-connect equipment and optical cross-connect equipments included in other node equipments, and determine a restoration route provisionally;

when said line terminal equipment has decided that a change-over to a restoration route passing through another node equipment should be conducted, causing said line terminal equipment to give a command functioning as trigger for optical fiber change-over to said optical cross-connect equipment included in its own node equipment; and causing said optical cross-connect equipment given said command to form a transmission line using said provisionally determined restoration route, wherein said command functioning as a trigger for optical fiber change-over comprises contents of protection switching bytes of an overhead signal of the SDH, and wherein said exchange of change-over control information is conducted by using an optical signal having a wavelength different from a normal wavelength used by said optical cross-connect equipments.

5. A communication network apparatus being formed by interconnecting a plurality of nodes via a plurality of transmission lines using optical fibers, each node of said plurality of nodes includes at least one set of node equipment including a line terminal equipment and an optical cross-connect equipment, wherein said optical cross-connect equipment in said one set of node equipment, comprises:

a communication controller connected to cross-connect equipment of other nodes for conducting communication between said node and other nodes, an equipment node information sending portion, connected to said communication controller, for conducting check of optical fibers connected to said node, another node OXC change-over request section, connected to said communication controller, for requesting other nodes to change-over switches according to a determined route by exchanging change-over control information between said optical cross-connect equipment of said node and optical cross-connect equipment of the other nodes, another node information collector, connected to said communication controller, for collecting node information concerned with operation state of an optical fiber, a change-over trigger acceptor, connected to said communication controller, for informing each component that a change-over trigger has occurred to start cross-connect, an optical switch controller, connected to said communication controller, for controlling optical switches, and a change over route determining section, connected to said communication controller, for determining a shortest usable route, wherein said exchange of change-over control information is conducted by using an optical signal having a wavelength different from a normal wavelength used by said optical cross-connect equipments, wherein said line terminal equipment in said one set of node equipment, comprises:

a communication controller for performing communication between said optical cross-connect equipment of said node, a change-over trigger generator, connected to said communication controller, for terminating Synchronous Digital Hierarchy (SDH) for detecting a fault and generating a trigger for causing a change-over by said optical cross-connect equipment, and a fault detector, connected to said change-over trigger generator, for detecting a fault of an optical fiber of an active system, wherein said trigger comprises contents of protection switching bytes of an overhead signal of the SDH.

6. A communication network apparatus according to claim 5, wherein at least one of said plurality of nodes comprising a single optical cross-connect equipment further comprises:

a communication controller connected to cross-connect equipment of other nodes for conducting communication between said node and other nodes, an equipment node information sending section, connected to said communication controller, for conducting check of optical fibers connected to said node, another node OXC change-over request section, connected to said communication controller, for requesting other nodes to change-over switches according to determined route by exchanging change-over control information between said node and the other nodes, another node information controller, connected to said a communication controller, for collecting node information concerned with operation state of an optical fiber, a change-over trigger acceptor, connected to said communication controller, for informing each component that change-over trigger has occurred to start cross-connect, an optical switch controller, connected to said communication controller, for controlling optical switches, a change-over route determining section, connected to said communication controller, for determining a shortest usable route, wherein said exchange of change-over control information is conducted by using an optical signal having a wavelength different from a normal wavelength used by said optical cross-connect equipments, a change-over trigger generator, connected to said communication controller, for detecting a fault and generating a trigger for a change-over to own node optical cross-connect equipment, and a fault detector, connected to said change-over trigger generator, for detecting a fault of an optical fiber of an active system.

* * * * *